(12) United States Patent
Dong et al.

(10) Patent No.: US 8,076,893 B2
(45) Date of Patent: Dec. 13, 2011

(54) DISPLACEMENT ACTUATION AND SENSING FOR AN ELECTROSTATIC DRIVE

(75) Inventors: Jingyan Dong, Raleigh, NC (US); Placid M. Ferreira, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 597 days.

(21) Appl. No.: 12/231,673

(22) Filed: Sep. 4, 2008

(65) Prior Publication Data

US 2010/0052597 A1    Mar. 4, 2010

(51) Int. Cl.
*H02N 1/00* (2006.01)

(52) U.S. Cl. ......................... 318/686; 310/309

(58) Field of Classification Search ............ 318/119, 318/466, 468, 652, 662, 686; 73/570, 579, 73/649, 650, 651, 662; 310/308, 309, 311
See application file for complete search history.

(56) References Cited

U.S. PATENT DOCUMENTS

| | | | |
|---|---|---|---|
| 5,249,465 A * | 10/1993 | Bennett et al. ............. | 73/510 |
| 5,345,824 A * | 9/1994 | Sherman et al. ........... | 73/514.18 |
| 5,719,073 A * | 2/1998 | Shaw et al. ................. | 438/53 |
| 5,753,911 A * | 5/1998 | Yasuda et al. .............. | 850/1 |
| 5,914,553 A | 6/1999 | Adams et al. | |
| 5,990,473 A | 11/1999 | Dickey et al. | |
| 6,000,280 A | 12/1999 | Miller et al. | |
| 6,122,964 A * | 9/2000 | Mohaupt et al. ........... | 73/514.32 |
| 6,127,767 A * | 10/2000 | Lee et al. ................... | 310/309 |
| 6,170,332 B1 | 1/2001 | MacDonald et al. | |
| 6,388,300 B1 * | 5/2002 | Kano et al. ................. | 257/419 |
| 6,473,713 B1 | 10/2002 | McCall et al. | |
| 6,497,141 B1 | 12/2002 | Turner et al. | |
| 6,508,122 B1 | 1/2003 | McCall et al. | |
| 6,561,029 B2 | 5/2003 | Folkmer et al. | |
| 6,611,168 B1 * | 8/2003 | Denison et al. ............ | 330/4.5 |
| 6,744,173 B2 | 6/2004 | Behin et al. | |
| 6,819,822 B2 | 11/2004 | Behin et al. | |
| 6,868,726 B2 | 3/2005 | Lemkin et al. | |
| 7,036,373 B2 | 5/2006 | Johnson et al. | |
| 7,155,978 B2 | 1/2007 | Lo et al. | |

(Continued)

FOREIGN PATENT DOCUMENTS

WO    WO 2008/010775 A1    1/2008

OTHER PUBLICATIONS

J Aebersold, et al., Design, Modeling, Fabrication and Testing of a MEMS Capacitive Bending Strain Sensor; Journal of Physics: Conference Series 34 (2006) 124-129; Institute of Physics Publishing.

(Continued)

*Primary Examiner* — Bentsu Ro
(74) *Attorney, Agent, or Firm* — Krieg DeVault LLP; L. Scott Paynter

(57) ABSTRACT

An electrostatic drive includes a first electrode and a second electrode responsive to a drive signal. The drive signal includes an actuation signal constituent and a sensing signal constituent. The sensing signal constituent is at a frequency higher than a natural mechanical resonant frequency of the electrostatic drive. In response to the actuation signal constituent, displacement between the first electrode and the second electrode changes, which is evaluated by detecting a change in an electrical characteristic of the drive as a function of the sensing signal constituent.

32 Claims, 15 Drawing Sheets

U.S. PATENT DOCUMENTS

| | | | |
|---|---|---|---|
| 7,258,010 B2* | 8/2007 | Horning et al. | 73/514.32 |
| 7,267,005 B1 | 9/2007 | Kranz et al. | |
| 7,275,433 B2 | 10/2007 | Caminada et al. | |
| 7,287,415 B2 | 10/2007 | Borwick, III et al. | |
| 7,290,435 B2 | 11/2007 | Seeger et al. | |
| 7,293,460 B2 | 11/2007 | Zarabadi et al. | |
| 7,302,848 B2 | 12/2007 | Kourepenis et al. | |
| 7,305,880 B2 | 12/2007 | Caminada et al. | |
| 7,873,191 B2* | 1/2011 | Bach | 382/124 |
| 2002/0020219 A1 | 2/2002 | DeRoo et al. | |
| 2002/0101769 A1 | 8/2002 | Garverick et al. | |
| 2004/0150939 A1 | 8/2004 | Huff | |
| 2005/0024165 A1 | 2/2005 | Hsu | |
| 2005/0189845 A1 | 9/2005 | Kihara | |
| 2006/0109538 A1 | 5/2006 | Mushika et al. | |
| 2006/0201250 A1 | 9/2006 | Kourepenis et al. | |
| 2006/0202933 A1 | 9/2006 | Pasch et al. | |
| 2008/0129302 A1 | 6/2008 | Shafai et al. | |

OTHER PUBLICATIONS

Babbitt, K., et al., A Surface Micromachined Capacitive Pressure Sensor for Biomedical Applications; 1997, IEEE.

Chau, et al., An Integrated Force-Balanced Capacitive Accelerometer for Low-G Applications; 8th International Conference on Solid-State Sensors and Actuators, and Eurosensors IX, Stockholm, Sweden, Jun. 25-29, 1995; Transducers '95—Eurosensors IX.

Chu, L. et al., A Micromachined 2D Positioner With Electrothermal Actuation and Sub-Nanometer Capacitive Sensing; Journal of Micromechanics and Microengineering, 2003 Institute of Physics Publishing.

Dong, J., et al; Design, fabrication and testing of a silicon-on-insulator (SOI) MEMS parallel kinematics XY stage; J. Micromech. Microeng. 17 (2007) 1154-1161;IOP Publishing.

Hah, D., et al.; Low-Voltage, Large-Scan Angle MEMS Analog Micromirror Arrays With Hidden Vertical Comb-Drive Actuators; Journal of Microelectromechanical Systems, V. 13, No. 2, Apr. 2004, IEEE.

Ferri, G., et al.; A Low-Voltage Integrated CMOS Analog Lock-In Amplifier Prototype for LAPS Applications; Sensors and Actuators A 92 (2001) 263-272; Elsevier Science B.V.

Garmire, D., et al.; MEMS Process Characterization With an On-Chip Device; Berkeley Sensor and Actuator Center, UC Berkeley, Berkeley, CA, USA, strive@cs.berkeley.edu.

Gnudi, A., et al.; Integrated Lock-In Amplifier for Sensor Applications; Bologna, Italy; pp. 58-61; agnudi@deis.unibo.it.

Horenstein, M., et al.; Differential Capacitive Position Sensor for Planar MEMS Structures With Vertical Motion; Sensors and Actuators 80 (2000) 53-61; Elsevier Science S.A.

Indermuhle, P., et al.; AFM Imaging with an XY-Micropositioner with Integrated Tip; Sensors and Actuators A 46-47 (1995) 562-565; Elsevier Science S.A.

Isamoto, K., et al.; A 5-V Operated MEMS Variable Optical Attenuator by SOI Bulk Micromachining; IEEE Jour. of Selected Topics in Quantum Electronics, V. 10, No. 3, May/Jun. 2004.

Jeong, H., et al.; Dynamic Analysis of a Resonant Comb-Drive Micro-Actuator in Linear and Nonlinear Regions; Sensors and Actuators A 125 (2005) 59-68; Elsevier B.V.

Kim, C., et al.; Micro XY-Stage Using Silicon on a Glass Substrate; Journal of Micromechanics and Microengineering 12 (2002) 103-107; IOP Publishing Ltd. UK.

Kim, C., et al.; Silicon Micro XY-Stage With a Large Area Shuttle and No-Etching Holes for SPM-Based Data Storage; Journal of Microelectromechanical Systems, V. 12, No. 4, Aug. 2003; IEEE.

Kuijpers, A., et al.; Capacitive Long-Range Position Sensor for Microactuators; 2004; pp. 544-547; IEEE.

Kuijpers, A., et al.; A Micromachined Capacitive Incremental Position Sensor: Part 2. Experimental Assessment; J. Micromech. Microeng. 16 (2006) S125-S134; IOP Publishing, UK.

Lai, Y., et al.; Metallic Micro Displacement Capacitive Sensor Fabricated by Laser Micromachining Technology; Microsyst Technol. (2006) 12: 778-785.

Lei, S., et al.; An Oversampled Capacitance-to-Voltage Converter IC with Application to Time-Domain Characterization of MEMS Resonators; IEEE Sensors Journal, vol. 5, No. 6, Dec. 2005.

Lemkin, M., et al.; A Three-Axis Micromachined Accelerometer with a CMOS Position-Sense Interface and Digital Offset-Trim Electronics; IEEE Journal of Solid-State Circuits, V. 34, No. 4, Apr. 1999.

Lu, G.N., et al.; A Novel Approach to Implementing On-Chip Synchronous Detection for CMOS Optical Detector Systems; Analog Integrated Circuits and Signal Processing, 37, 57-66, 2003; Kluwer Academic Publishers; Netherlands.

Lu, Y., et al.; Design, Fabrication and Control of a Micro X-Y Stage with Large Ultra-Thin Film Recording Media Platform; Proceedings of the 2005 IEEE/ASME; International Conf. on Advanced Intelligent Mechatronics.

Lu, M., et al; Position Control of Parallel-Plate Microactuators for Probe-Based Data Storage; Journal of Microelectromechanical Systems, vol. 13, No. 5, Oct. 2004, IEEE.

Pilla, S., et al.; Very High Sensitivity AC Capacitance Bridge for the Dielectric Study of Molecular Solids at Low Temperatures; Review of Scientific Instruments vol. 70, No. 10, Oct. 1999, American Institute of Physics.

Sun Y., et al.; A High-Aspect-Ratio Two-Axis Electrostatic Microactuator with Extended Travel Range; Sensors and Actuators A 102 (2002) 49-60; Elsevier Science B.V.

Suster, M., et al.; Low-Noise CMOS Integrated Sensing Electronics for Capacitive MEMS Strain Sensors; IEEE 2004 Custom Integrated Circuits Conference.

Tang, W., et al.; Laterally Driven Polysilicon Resonant Microstructures; Sensors and Actuators, 20 (1989) 25-32; Elsevier Sequoia; The Netherlands.

Tang, W., et al.; Electrostatic Comb Drive Levitation and Control Method; Journal of Microelectromechanical Systems, vol. 1, No. 4, Dec. 1992, IEEE.

Tavakoli, M., et al.; An Offset-Canceling Low-Noise Lock-In Architecture for Capacitive Sensing; IEEE Journal of Solid-State Circuits, vol. 38, No. 2, Feb. 2003.

Van Spengen, W., et al.; A Sensitive Electronic Capacitance Measurement System to Measure the Comb Drive Motion of Surface Micromachined MEMS Devices; J. Micromech. Microeng. 17 (2007) 828-834; IOP Publishing Ltd., UK.

Dong, J., et al., Simultaneous actuation and displacement sensing for electrostratic drives; Journal of Micromechanics and Microengineering; Jan. 2008.

* cited by examiner

DISPLACEMENT ACTUATION AND SENSING FOR AN ELECTROSTATIC DRIVE

FEDERALLY SPONSORED RESEARCH OR DEVELOPMENT

The present invention was made with Government assistance under NSF Grant Contract Number DMI 0328162 and DMI 0422687. The Government has certain rights in this invention.

BACKGROUND

The present invention relates to the operation of electrostatic actuators, and more particularly, but not exclusively relates to simultaneous actuation and sensing techniques for such devices.

In Microelectromechanical Systems (MEMS), electrostatic drives, such as comb drives, typically rely on different actuation and sensing structures for feedback control. Separate actuation and sensing structures tend to undesirably add to the moving mass of the device—potentially resulting in a decrease of the device resonant frequency and correspondingly the operational frequency range of the device. Also, separate structure can lead to additional flexures, such as hinges or leaf springs, that add mechanical resistance and correspondingly reduces the displacement range of the device. Alternatively or additionally, existing schemes tend to be exceedingly complex, require incorporation of materials unfriendly to standard MEMS device fabrication techniques, and/or utilize more device "real estate" than is otherwise desired. Thus, there is an ongoing demand for further contributions in this area of technology.

SUMMARY

One embodiment of the present invention includes a unique operating technique for an electrostatic drive. Other embodiments include unique apparatus, devices, systems, and methods of actuation and sensing for an electrostatic drive. Further embodiments, forms, objects, features, advantages, aspects, and benefits of the present application shall become apparent from the detailed description and drawings included herein.

DETAILED DESCRIPTION OF REPRESENTATIVE EMBODIMENTS

Figure 1:
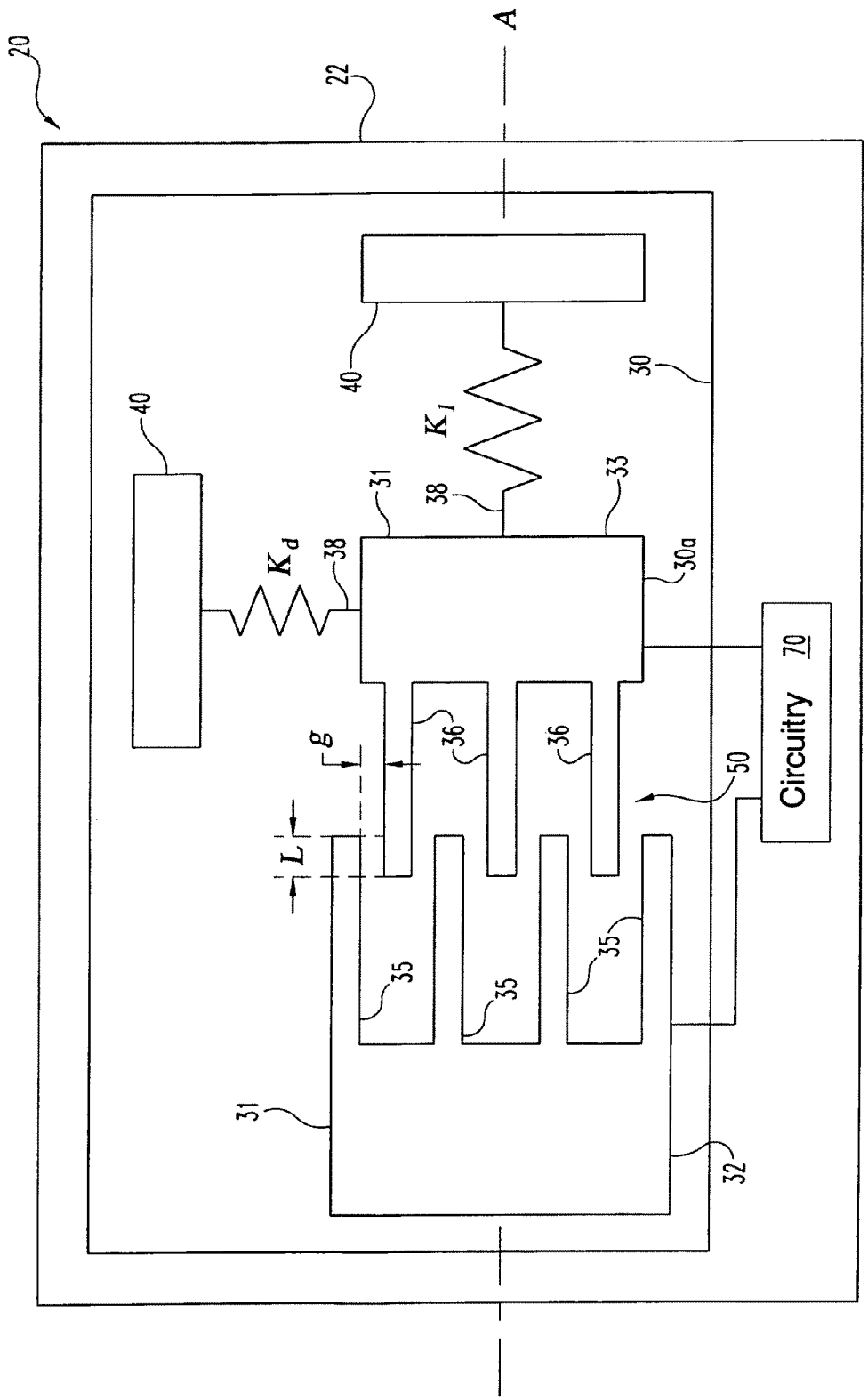
FIG. 1 is a partial diagrammatic view of a microelectromechanical system (MEMS).

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present application includes a microelectromechanical system (MEMS) with an electrostatic drive. This drive includes a first electrode spaced apart from a second electrode. The drive is responsive to an electric drive signal to change displacement between the first electrode and second electrode. The system further includes circuitry with a signal source to generate the drive signal and a monitoring circuit to evaluate the displacement. The drive signal simultaneously provides an actuation constituent and a sensing constituent. The sensing constituent has a frequency greater than a natural resonant frequency of the drive. The monitoring circuitry detects a change in capacitance indicative of the displacement as a function of the sensing constituent of the drive signal.

FIG. 1 is a partial diagrammatic view of a microelectromechanical system (MEMS) 20. System 20 is in the form of a monolithic device 22 including MEMS electrostatic actuator 30 and integrated electrical circuitry 70 coupled to actuator 30, that can be made using standard lithographic/MEMS manufacturing techniques and materials. Actuator 30 is in the form of a comb drive 30a with electrodes 31. Electrodes 31 are further designated as fixed stator 32 and slider or rotor 33. Stator 32 includes several stator electrode fingers 35 and rotor 33 includes several rotor electrode fingers 36 that are interdigitated with fingers 35 and spaced apart therefrom. Fingers 35 and fingers 36 overlap by a distance L along actuation axis A and are depicted with a separation gap g that extends perpendicular to axis A. Rotor 33 moves relative to stator 32 in response to a drive signal from circuitry 70. As rotor 33 moves, it is displaced relative to stator 32. Accordingly, distance L changes with the position of rotor 33 relative to stator 32.

The interdigitated fingers 35 ad 36 between fixed stator 32 and the movable rotor 33 form a variable capacitive structure 50. Rotor 33 is connected to MEMs anchors 40 of system 20 by flexible suspending structure 38, which may be comprised of folded springs or the like. The stiffness of suspending structure 38 is represented by a spring constant $K_d$ in the direction of actuation along axis A and a spring constant $K_1$ in the lateral direction perpendicular to axis A. Typically, $K_1$ is much greater (stiffer) than $K_d$ to reduce side instability.

Figure 2:
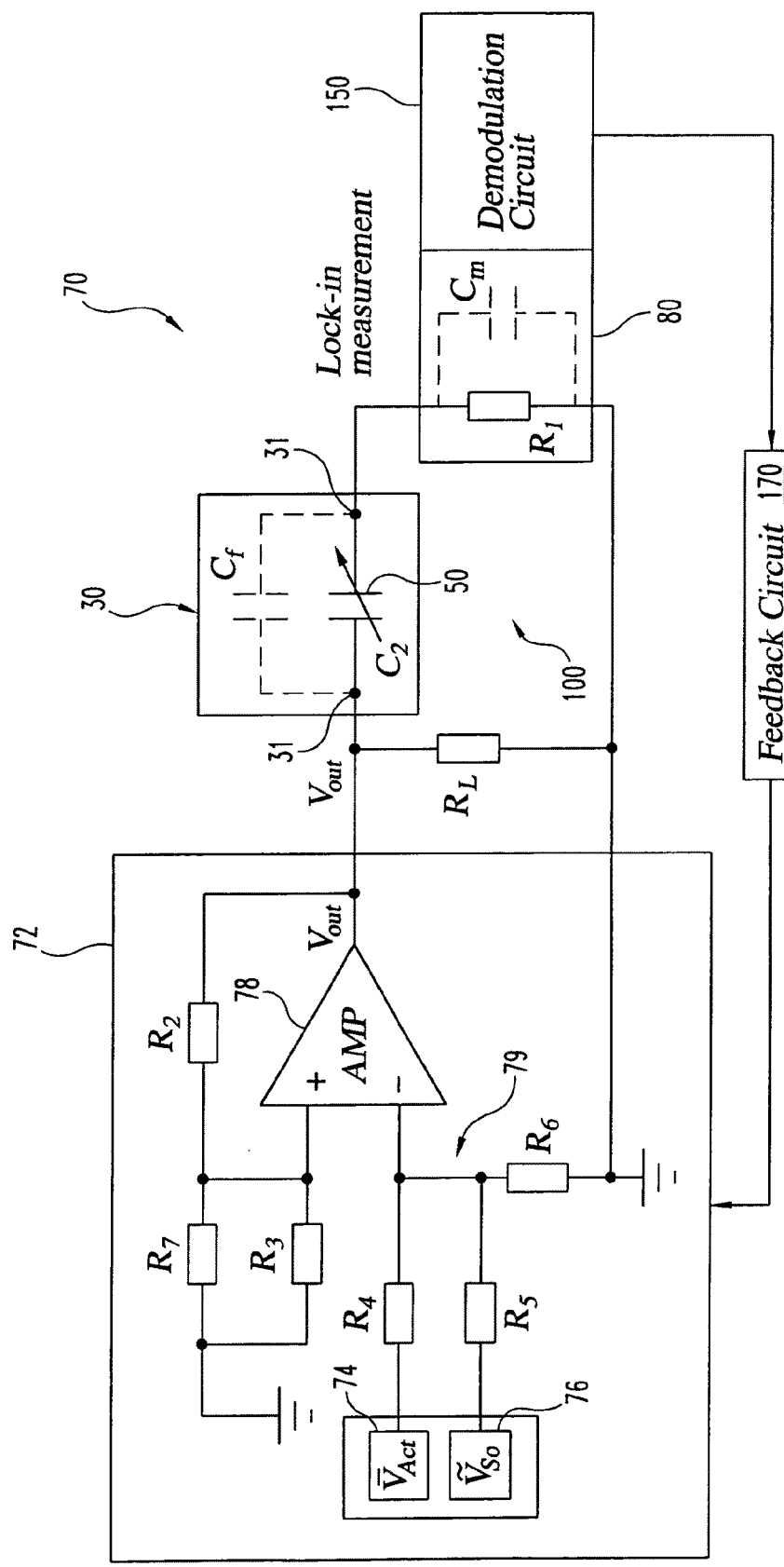
FIG. 2 is a schematic view of circuitry for the system of FIG. 1.

FIG. 2 is a schematic view of electrical circuitry 70. Circuitry 70 includes electric signal source 72, displacement monitoring circuit 80, and feedback/control circuit 170. Source 72 includes an actuation signal generator 74 and a sensing signal generator 76, operational amplifier (AMP) 78, and resistors $R_2$-$R_7$. Resistors $R_2$-$R_7$ and operational amplifier 78 are coupled together to define voltage adder 79 with output signal $V_{out}$. Generator 74 and generator 76 provide inputs to adder 79 designated as actuation signal $V_{Act}$ and sensing signal $V_{Sen}$, such that the output signal $V_{out}$ is the sum of the these inputs ($V_{out}=V_{Act}+V_{Sen}$). Correspondingly, $V_{Act}$ and $V_{Sen}$ are combined constituents of the output signal $V_{out}$. This output is applied to actuator 30 as an electrostatic drive signal as further described hereinafter.

In circuitry 70, actuator 30 is schematically represented by a variable capacitor $C_C$ between electrodes 31 that corresponds to the gap g between electrodes 31, where air is typically the dielectric within this gap. Circuitry 70 models any parasitic capacitance associated with actuator 30 with capacitor $C_P$ (shown in phantom), which is electrically coupled parallel to capacitor $C_C$. In addition, resistor $R_{load}$ is electrically connected from the output of adder 79 to electrical ground. Resistor $R_{load}$ protects actuator 30 by providing an alternative route through which to dissipate current/charge surges Displacement monitoring circuit 80 includes resistor R1 electrically coupled in series with actuator 30. Resistor R1 and actuator 30 can be modeled as an RC circuit 100, and more generally as respective impedances $Z_1$ and $Z_2$ electrically coupled in series. Monitoring circuit 80 includes a demodulation circuit 150 to process the voltage drop signal $V_{R1}$ across resistor $R_1$ in such manner that it is representative of displacement between stator 32 and rotor 33. The output of demodulation circuit 150 is provided to feedback/control circuit 120 that in turn is coupled to source 72 to provide closed loop control of drive 30a.

Figure 4:
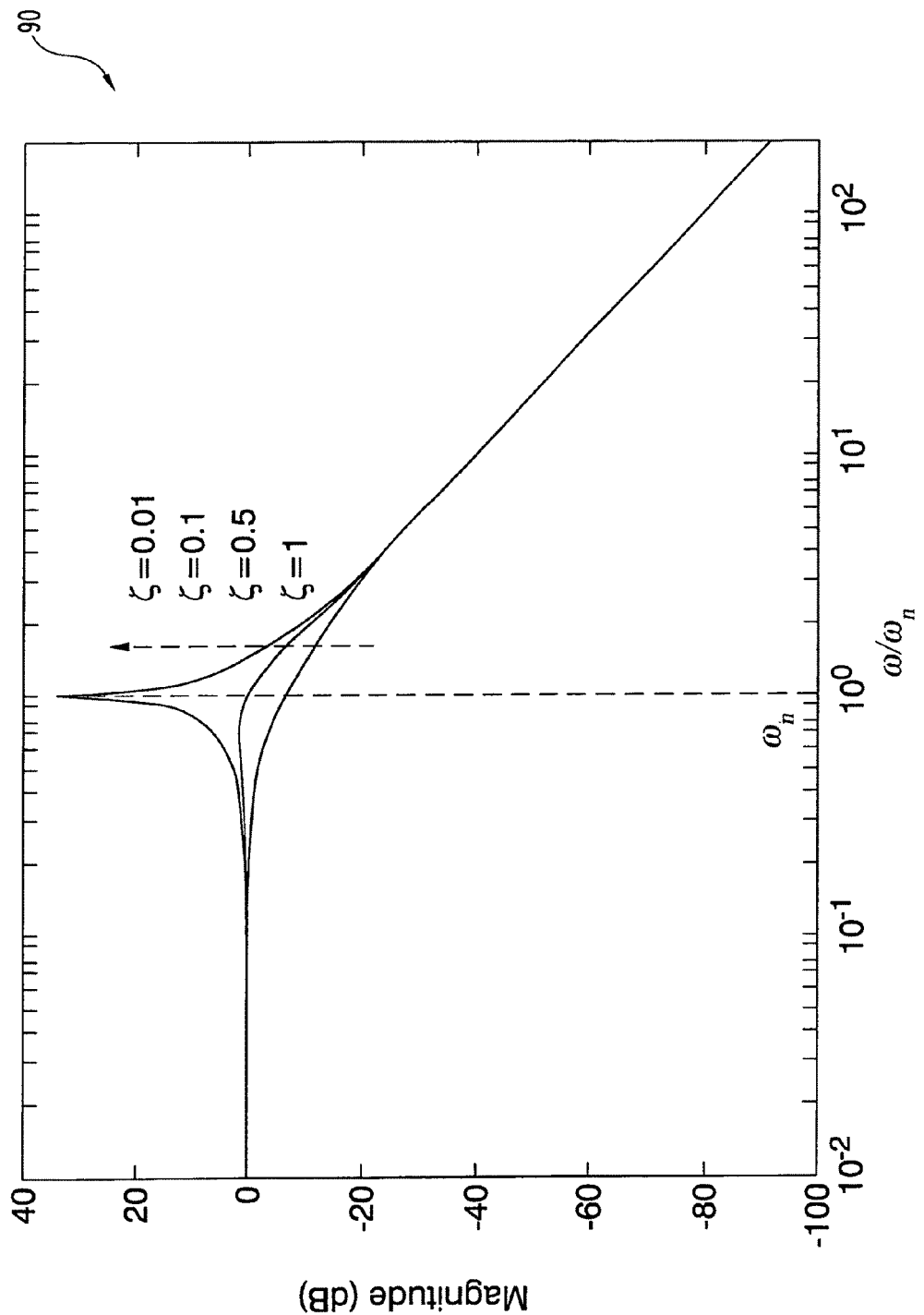
FIG. 4 is a Bode plot depicting natural resonant frequency of an electrostatic actuator included in the system of FIG. 1.

The actuation signal $V_{Act}$ is typically a low-frequency or DC signal in the 0 through 100 Hertz (Hz) range. At low frequencies, due to its small capacitance, the comb drive has a relatively high impedance (ideally infinite for a constant-level DC signal). The typical MEMS actuator drive structure mechanically behaves as a second-order mass-spring-damper system, which attenuates mechanical response to a negligible level for input drive signals with a frequency significantly higher than the mechanical resonant frequency of such structure. For a comb actuator with n fingers in rotor 32 (assuming no fringe effects), the overall force is $F=n(\in t/g)V^2$, where $\in$ is the permittivity of free space, t is the thickness of interdigitated fingers, g is the gap between fingers and V is the drive voltage. Assuming that the stiffness along the actuation direction (axis A) is constant, $K_d$, when the actuated displacement is much less than the compliant dimension of the suspension structure, then the static displacement of the actuator is $d=\Delta L=F/K_d$. This displacement causes the capacitance in the gap g of the structure to change by $\Delta C=(\in t/g)\Delta L=(\in t/g)d$, suggesting a proportional relationship between the state (displacement) of the drive and its capacitance. Further, during actuation, in addition to the capacitive driving force and the restoring spring force of the suspension structure 38, the comb drive 30a overcomes the initial force of the mass of the moving structure, the viscous and squeeze damping forces due to the air in the interdigitated structures, and other interactions the structure may have with the environment, leading to a second-order mass-spring-damping dynamic model, as follows in expression (1):

$$m\overset{*}{d} + f\overset{*}{d} + K_d d = F \qquad (1)$$

or $$\frac{d(s)}{F(s)} = \frac{1}{ms^2 + fs + K_d} = \frac{k}{s^2 + 2\xi\omega_n s + \omega_n^2}$$

where: m is the equivalent mass of the device, f is the damping coefficient, $k=1/m$, $\omega_n=\sqrt{K_d/m}$ is the natural resonant frequency, and $$\xi = \frac{f}{2\sqrt{mK_d}}$$

is the damping ratio. The normalized (with the horizontal axis set to the ratio: $\omega/\omega_n$) magnitude bode plot for such a second-order system as shown in FIG. 4, indicates that when the frequency of the input (which is voltage for drive 30a) is greater than the natural resonant frequency ($\omega>\omega_n$) the gain or magnitude of the transfer function (in this case the ratio of amplitude of mechanical displacement to input voltage) decays at a rate of 40 dB (1/100) per decade. Thus, for an input signal with a frequency 100 times larger than the resonant frequency con, the magnitude of the response is $10^{-4}$ times that of a DC or low frequency input with the same amplitude. As result, a sensing signal with a frequency much higher than the structure's resonant frequency can be superposed on the actuation signal without appreciably impacting actuation.

Figure 3:
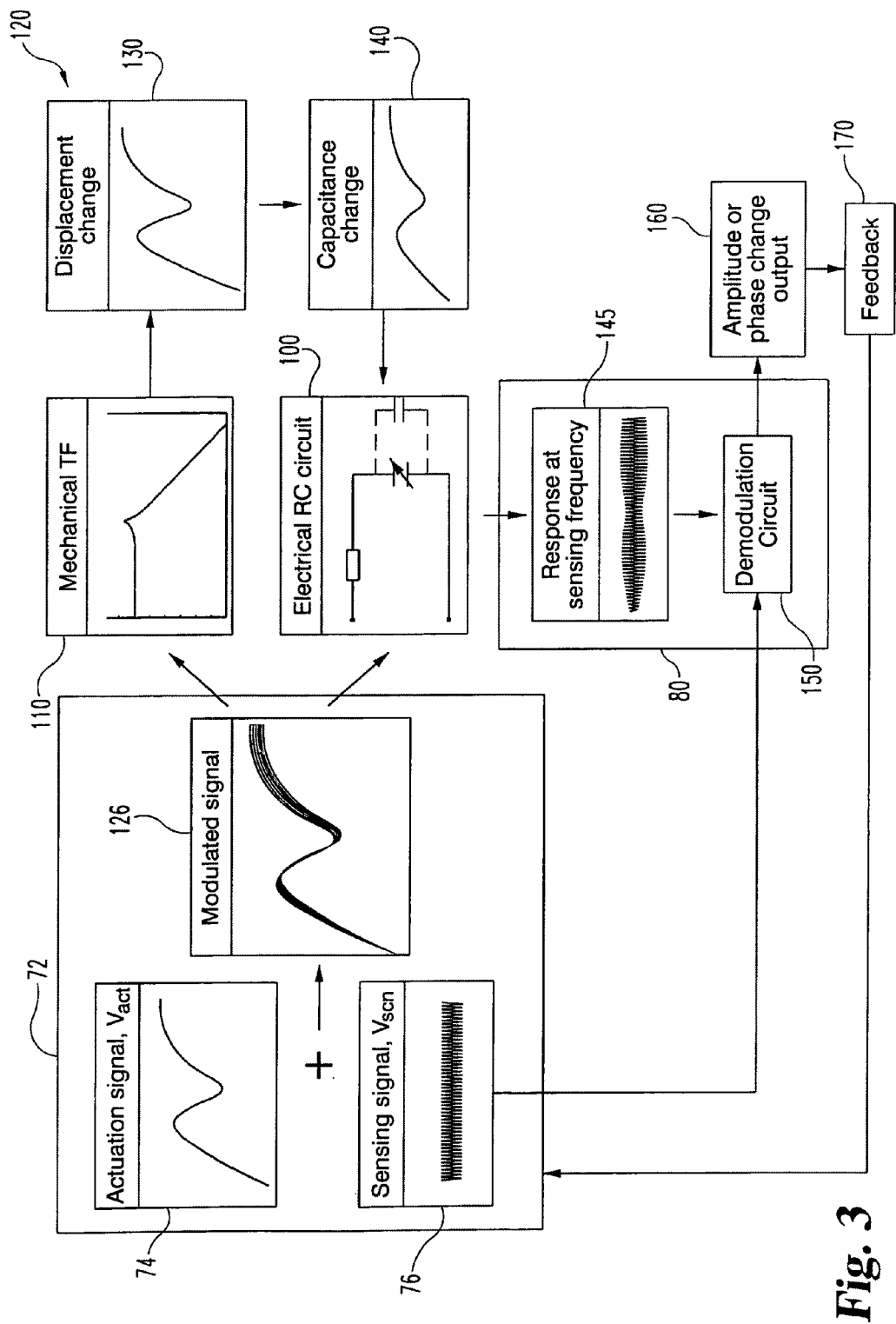
FIG. 3 is a control diagram illustrating various operational aspects of the system of FIG. 1.

Referring additionally to FIG. 3, a control diagram illustrates one procedure 120 for operating system 20 with simultaneous actuation and displacement sensing for drive 30a; where like reference numerals refer to like features previously described. The summed signal components from generators 74 and 76 are depicted within signal source 72 and output as a composite modulated signal $V_{out}$. In one embodiment, sensing signal $V_{sen}$ is generated at a frequency above the natural resonant frequency of drive 30a and $V_{Act}$ has a frequency below this resonant frequency (including a frequency of zero—that is a DC-type signal). In a preferred embodiment, the frequency of $V_{sen}$ is at least 100 times greater than the natural resonant frequency of drive 30a. In a more preferred embodiment, $V_{sen}$ is at least 1000 times greater than the natural resonant frequency of drive 30a. In an even more preferred embodiment, $V_{sen}$, is at least 10,000 times greater than the natural resonant frequency of drive 30a.

The actuation signal $V_{Act}$ constituent of composite signal $V_{Out}$ electrostatically drives actuator 30, resulting in the generation of a mechanical force as represented by operation 110. In turn, this force causes a change in displacement ($\Delta L$) between electrodes 31 as represented by operation 130. This change in displacement ($\Delta L$) causes the capacitance in the gap g of the structure to change ($\Delta C$) as represented by operation 140. Drive signal $V_{out}$ is also applied to the electrical RC circuit 100 defined by circuitry 70 which is further influenced by the change in capacitance ($\Delta C$). More specifically, the sensing signal $V_{sen}$ constituent of $V_{out}$ provides a vehicle to detect the degree of capacitance change (ΔC) in RC circuit 100 and correspondingly the displacement change (ΔL).

Because the frequency of sensing signal $V_{sen}$, is significantly above the mechanical resonant frequency of drive 30a, it provokes no appreciable mechanical response; however, it does experience a significant amplitude and phase modulation as capacitance of drive 30a changes with displacement, which is represented by response signal 145 ($V_{R1}$). By monitoring these changes with circuit 80 relative to the input signal, the displacement of drive 30a can be obtained without additional sensing structure. Accordingly, both the sensing signal $V_{sen}$ and the response from $V_{R1}$ are input to demodulation circuit 150 of monitoring circuit 80. Circuit 150 provides an output signal 160 corresponding to a change in the amplitude that is representative of displacement, which is provided to feedback circuit 170 for closed-loop control. Circuit 150 is further described in connection with FIG. 5 hereinafter.

Considering a specific nonlimiting example, if the measurement or sensing is done at a frequency of 100 kHz, the impedance of drive 30a in the actuation frequency band is about 1000 times less than the sensing frequency. With the selection of resistor R1 to have a value of impedance close to that of drive 30a at the sensing frequency, its impedance is very small compared to that of drive 30a for an actuation frequency band about 1000 times smaller. Thus, most of the voltage drop in the actuation frequency band occurs across drive 30a relative to the voltage drop across resistor R1. The magnitude of voltage drop on resistor R1 as a result of the actuation voltage is provided in expression (2) as follows:

$$V_{R_1} = \left|\frac{R_1}{1/j\omega C_c + R_1}\right| V_{Act} = \frac{\omega R_1 C_c}{\sqrt{1+(\omega R_1 C_c)^2}} V_{Act} \quad (2)$$

For a MEMS-scale capacitive drive system, $C_C$ is in the range of 0.5 picoFarad (pF). If resistor $R_1$ is 1 Megaohm (MΩ), then $V_{R1}=0.0003V_{Act}$ at 100 Hz and $V_{R1}=3\times10^{-6} V_{Act}$ at 1 Hz. For a maximum actuating input of about 100 Volts (V), the voltage drop on the resistor is less than 0.03 V. Thus the sensing circuit is subjected to a very small fraction of the actuation input. Consequently, for a single silicon chip implementation of monitoring circuit 80, standard low voltage design techniques can be utilized.

When actuated, the capacitance of the comb structure changes accordingly to expression (3) as follows:

$$\Delta C = (\in t/g)\Delta L = (\in t/g)d \quad (3)$$

At the sensing frequency, the impedance due to the comb drive capacitance, 1/jωC, is smaller than in the actuation frequency band and comparable to that of the resistance. The change of capacitance of drive 30a due to mechanical displacement therefore produces a more pronounced change in the behavior of the RC circuit model at this frequency, introducing an amplitude and phase change on the voltage drop across the resistor or capacitor at the sensing frequency relative to sensing signal $V_{sen}$.

Because the reference frequency is a parameter that is selected, this amplitude or phase change can determined to represent displacement and/or capacitance change. Under ideal conditions, when parasitic capacitance is negligible, both the phase or amplitude change over the resistor $R_1$ can be used to detect the change of the capacitance. When parasitic capacitance is negligible, the model of expressions (4) and (5) can be applied (in terms of generalized impedance values $Z_1$ and $Z_2$):

$$V_{R_1} = \frac{Z_1}{Z_1+Z_2}V_{in} = \frac{j\omega R_1 C_c}{1+j\omega R_1 C_c}V_{in}, \quad (4)$$

thus $$G_{R_1} = \left|\frac{V_{R_1}}{V_{in}}\right| = \frac{\omega R_1 C_c}{\sqrt{1+(\omega R_1 C_c)^2}}$$

$$\phi_{R_1} = \tan^{-1}\frac{1}{\omega R_1 C_c} \quad (5)$$

When parasitic capacitance is not negligible compared to the drive capacitance, the voltage across the resistor can be modeled with expressions (6) and (7) as follows:

$$V_{R_1} = \frac{Z_1}{Z_1+Z_2}V_{in} \quad (6)$$

$$= \frac{\frac{R_1}{1+j\omega R_1 C_m}}{\frac{R_1}{1+j\omega R_1 C_m} + \frac{1}{j\omega(C_p+C_c)}}V_{in}$$

$$= \frac{j\omega R_1 (C_p+C_c)}{1+j\omega R_1 (C_p+C_c+C_m)}V_{in}$$

$$G_{R_1} = \left|\frac{V_{R_1}}{V_{in}}\right| = \frac{\omega R_1(C_p+C_c)}{\sqrt{1+[\omega R_1(C_p+C_c+C_m)]^2}} \quad (7)$$

and $$\phi_{R_1} = \tan^{-1}\frac{1}{\omega R_1(C_p+C_c+C_m)},$$

where: $Z_1$ is the impedance of the combined resistor R1 and the parasitic capacitance $C_m$, $Z_2$ is the impedance of the combined comb capacitance $C_c$ and parasitic capacitance $C_p$, and ω is the sensing frequency.

If parasitic capacitance from monitoring circuit 80 is very large when compared with that from the device, the phase change would be small but the amplitude change can still be significant. When $C_m \gg C_c$, corresponding to a certain displacement or capacitance change $dC_c$, the gain change or change in magnitude of the output signal with unit input signal can be modeled by expression (8) as follows:

$$dG_{R_1} \cong \frac{\omega R_1}{\sqrt{1+[\omega R_1(C_p+C_c+C_m)]^2}}dC_c = k(dC_c) \quad (8)$$

which indicates that the amplitude change is proportional to the capacitance change.

Further, it may be observed that the sensitivity is increased when the amplitude change of the voltage across resistor $R_1$ is increased compared to its initial amplitude. Expression (9) further defines the amplitude ratio as follows:

$$\frac{dG_{R_1}}{G_{R_1}} \cong \frac{\omega R_1}{\omega R_1(C_p+C_c)}dC_c = \frac{dC_c}{C_p+C_c} \quad (9)$$

Based on expression (9), precision increases with amplitude change ratio, and the smaller the parasitic capacitance $C_c$, the larger the amplitude change ratio.

Figure 5:
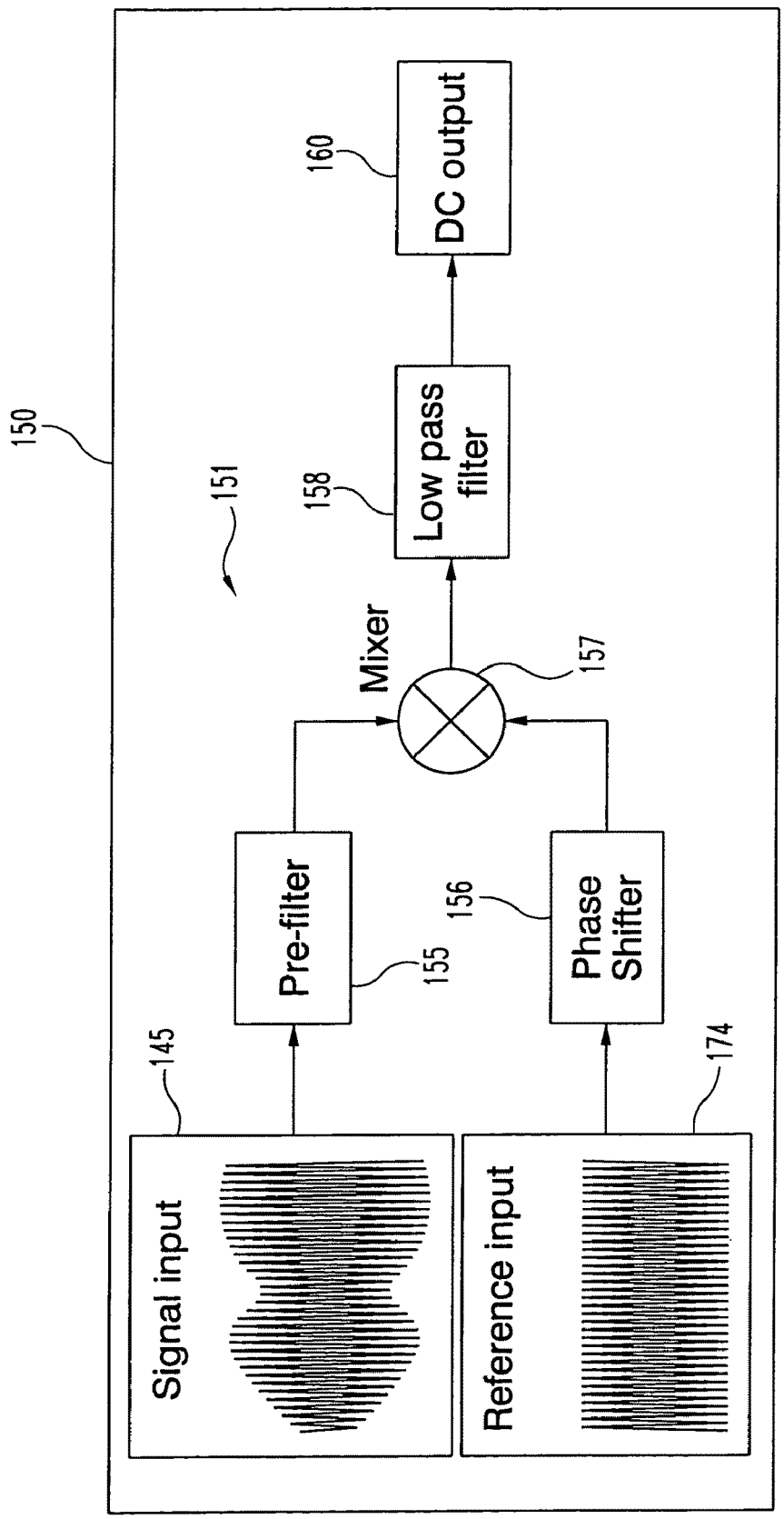
FIG. 5 is a control diagram illustrating one type of demodulation circuit included in the circuitry of FIG. 2.

Referring to FIG. 5, a control diagram illustrating demodulation circuit 150 is further described; where like reference numerals refer to like features previously described. Circuit 150 includes a lock-in circuit 151 tuned to the input sensing frequency to detect amplitude changes. As inputs, lock-in circuit 151 receives the response signal 145 ($V_{R1}$) from RC circuit 100, and $V_{sen}$ from generator 74 to serve as a reference. The reference input is filtered by pre-filter 155 and the response signal input is input to phase shifter 156. The outputs of pre-filter 155 and phase shifter 156 are input to multiplier/mixer 157. The output from mixer 157 is input to low-pass filter 158. The output signal 160 from low-pass filter 158 is representative of the amplitude change in this case. Circuit 150 defines a standard form of demodulator that provides a high precision output with a significant degree of noise immunity.

Figure 6:
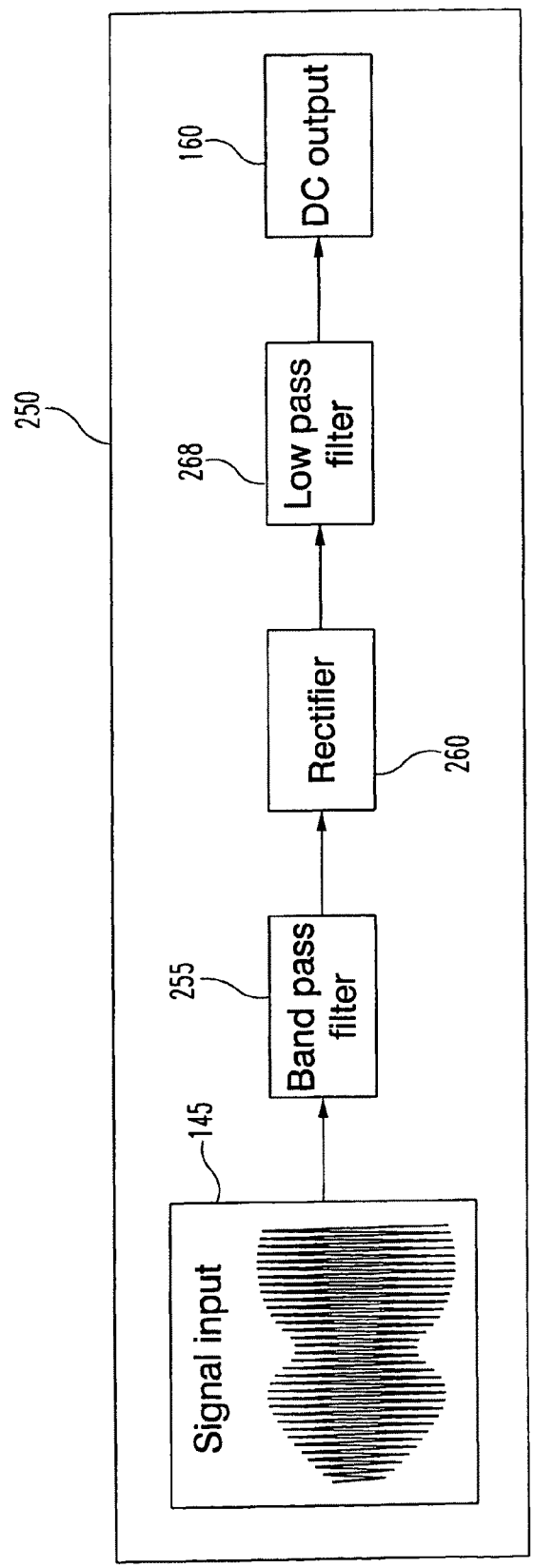
FIG. 6 is a control diagram illustrating another type of demodulation circuit that can be used in the system of FIG. 1 as an alternative to the circuit of FIG. 5.

For low noise and/or less precise applications, FIG. 6 depicts an alternative demodulation circuit 250; where like reference numerals refer to like features previously described. Because sensing signal $V_{sen}$ has a known frequency, it can be isolated with a band-pass filter 255 centered at the signal's frequency and converted to a DC voltage with rectifier 260 electrically coupled in series with low-pass filter 268. Either circuit 150 or 250 can be implemented on a chip using standard techniques to provide system 20 with high signal integrity in a stand-alone form, as well as having both actuation and sensing capabilities.

Figure 7:
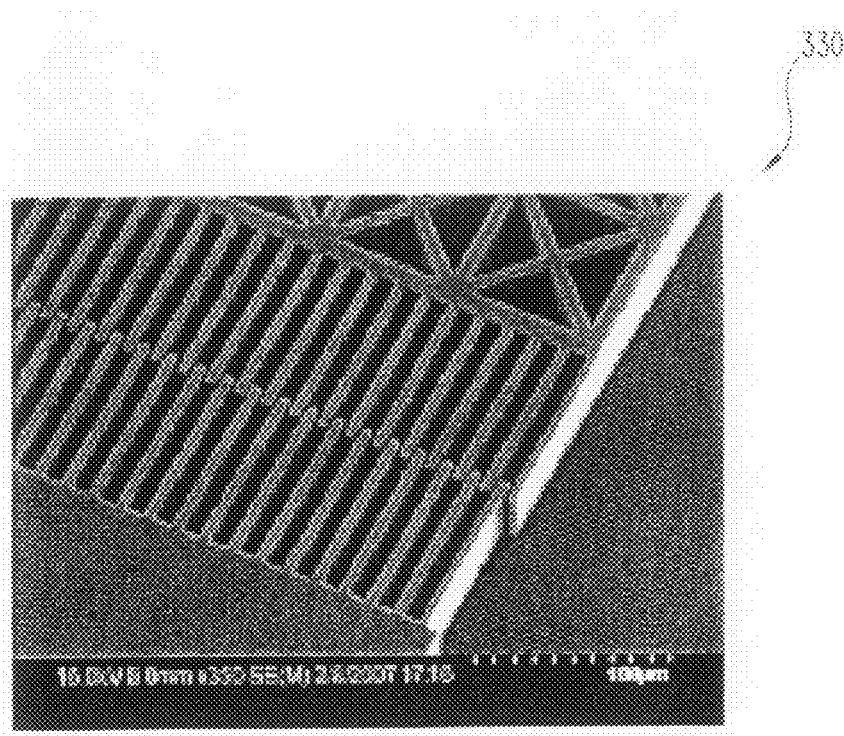
FIGS. 7 and 8 are computer-generated gray scale images of a linear comb drive and a rotary comb drive of other embodiments of the present invention, respectively.
Figure 8:
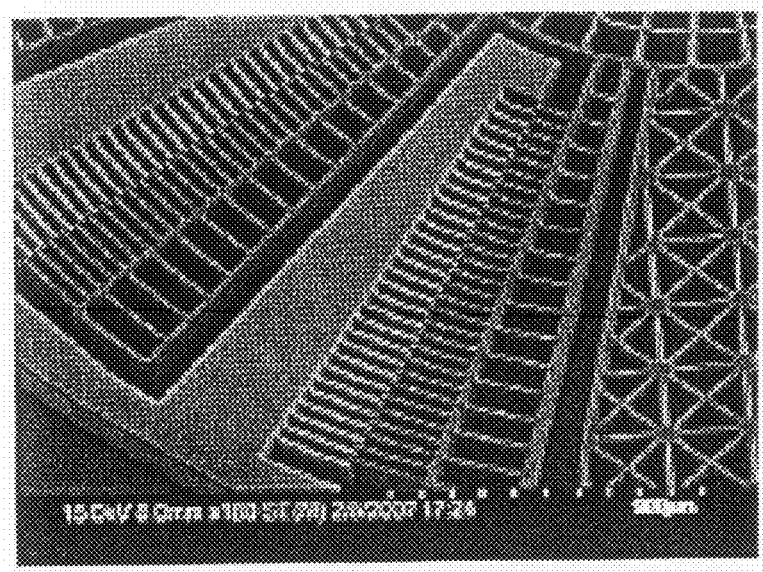

Many different embodiments of this present application are envisioned. Referring to FIGS. 7 and 8, a computer-generated Scanning Electron Microscope (SEM) image of a linear electrostatic drive 330 and a computer generated SEM image of a rotary electrostatic drive 430 (also of a comb type) are illustrated, respectively. In alternative embodiments of the present application, each drive 330 and 430 is driven/controlled by circuitry 70, using a composite drive signal with actuation and sensing signal constituents as previously described. Indeed, many other electrostatic drive types could be used with the actuation/sensing techniques of the present application. In still other embodiments, a different monitoring circuit configuration is used to detect a change in capacitance as a function of the sensing signal constituent. Alternatively or additionally, a feedback circuit is absent in further embodiments. In still other embodiments, actuation and sensing may not be performed simultaneously and/or additional sensing structures may be utilized.

Still a different embodiment includes: providing an electrostatic comb drive including a first electrode with several first fingers and a second electrode with several second fingers, the first fingers and the second fingers being interdigitated and spaced apart from one another; applying an electric drive signal to the electrostatic comb drive, the electric drive signal including an actuation signal constituent and a sensing signal constituent, the sensing signal constituent being in a frequency range above a natural mechanical resonant frequency of the electrostatic comb drive; in response to the actuation signal, changing displacement of the first electrode relative to the second electrode; and evaluating the displacement by detecting a change corresponding to a capacitance variation between the first electrode and the second electrode as a function of the sensing signal constituent.

In a further embodiment, an electrostatic comb drive includes a first electrode with several first fingers interdigitated with several second fingers of a second electrode. Also included are: means for applying an electric drive signal to the electrostatic comb drive that includes an actuation signal constituent and a sensing signal constituent in a frequency range above a mechanical resonant frequency of the electrostatic comb device, means for changing displacement of the first electrode relative to the second electrode in response to the actuation signal constituent, and means for evaluating the displacement by detecting a change corresponding to a capacitance variation between the first electrode and the second electrode as a function of the sensing signal constituent.

Another embodiment is directed to a microelectromechanical device that comprises: an electrostatic comb drive including a first electrode with several first fingers and a second electrode with several second fingers that are interdigitated and spaced apart from the first fingers; and circuitry including a signal source to generate an electric drive signal with an actuation signal constituent and a sensing signal constituent, an electric node to monitor an electrical evaluation signal indicative of the displacement of the first electrode relative to the second electrode in response to the drive signal from the signal source, a filter applied to the electrical response to output a response signal selective to the frequency range, and a signal processing circuit to provide an output representative of the displacement in accordance with the response signal.

A further embodiment of the present application includes a microelectromechanical device comprising: a signal source to provide an electric drive signal including a displacement actuation signal constituent and a displacement sensing signal constituent; a linear electrostatic drive including a first electrode and a second electrode spaced apart from the first electrode, which are responsive to the drive signal to change relative displacement therebetween with the displacement sensing signal constituent being at a frequency range higher than a mechanical resonant frequency of the drive; and circuitry coupled to the drive to monitor electrical response of the drive to the drive signal. This circuitry may be structured to evaluate the displacement by detecting a change corresponding to capacitance variation between the first and second electrodes as a function of the sensing signal constituent and the electrical response.

In yet a further embodiment, a linear electrostatic drive includes a first electrode and a second electrode. Also included are: means for supplying a drive signal to the drive, where such drive signal includes an actuation signal constituent and a sensing signal constituent that is at a frequency higher than a mechanical resonant frequency of the drive; means for displacing the first electrode relative to the second electrode in response to the actuation signal constituent; and means for detecting a displacement of the first electrode that includes means for determining one or more of a change in magnitude and a change in phase of an evaluation signal as a function of the sensing signal constituent.

Still another embodiment comprises: applying an electric drive signal to a linear electrostatic drive, where the signal includes an actuation signal constituent and a sensing signal constituent. The linear electrostatic drive includes a first electrode and a second electrode with the sensing signal constituent being at a frequency higher than a natural mechanical resonant frequency of the drive. Also included are: displacing the first electrode relative to the second electrode in response to the actuation signal constituent; and detecting the displacing of the electrode, which includes determining one or more of a change in magnitude and a change in phase of an evaluation signal as a function of the sensing signal constituent.

EXPERIMENTAL EXAMPLES

Figure 9:
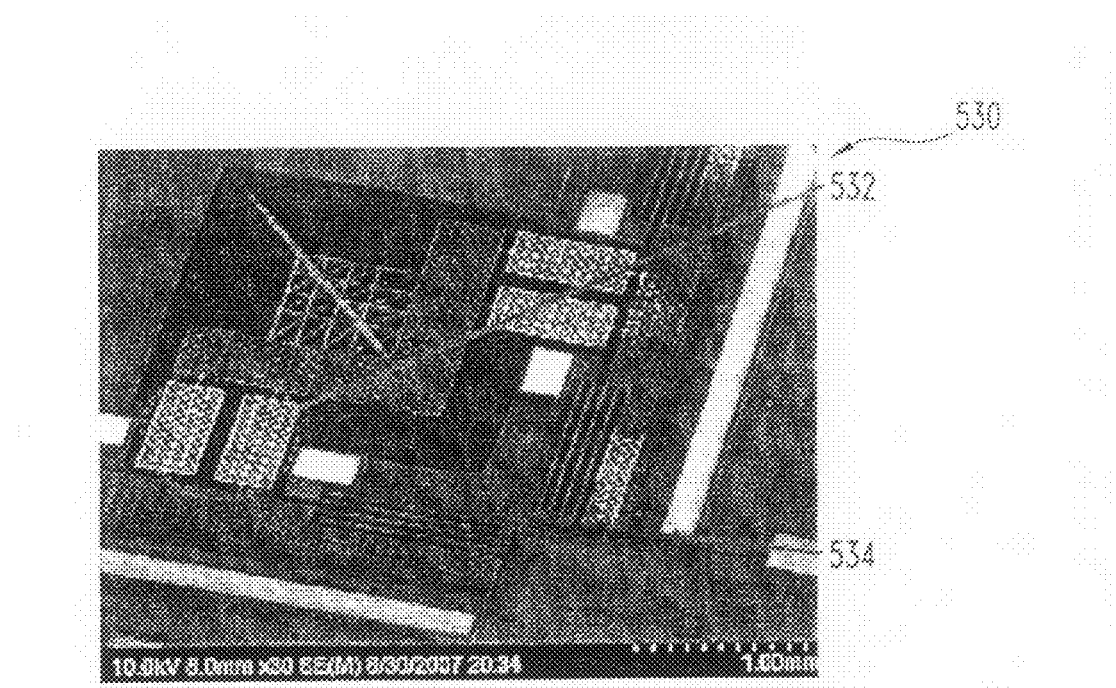
FIG. 9 is a computer-generated gray scale image of a MEMS XY stage device including an electrostatic comb drive used for experimental verification.
Figure 10:
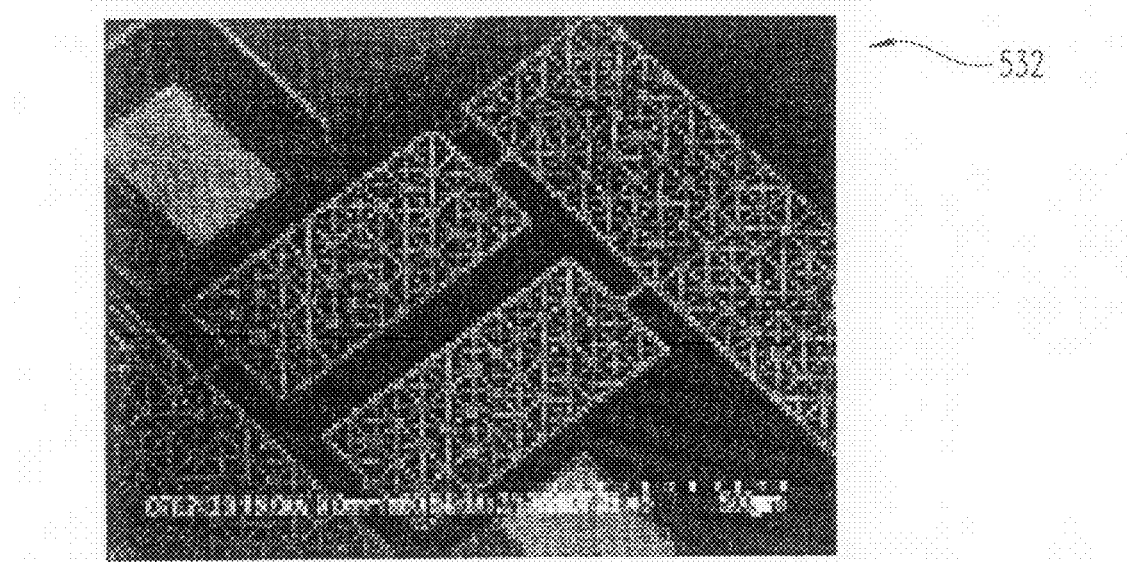
FIG. 10 is a computer-generated gray scale image of a four bar linkage of the XY stage as circled on the left-hand side of FIG. 9 and enlarged relative thereto.
Figure 11:
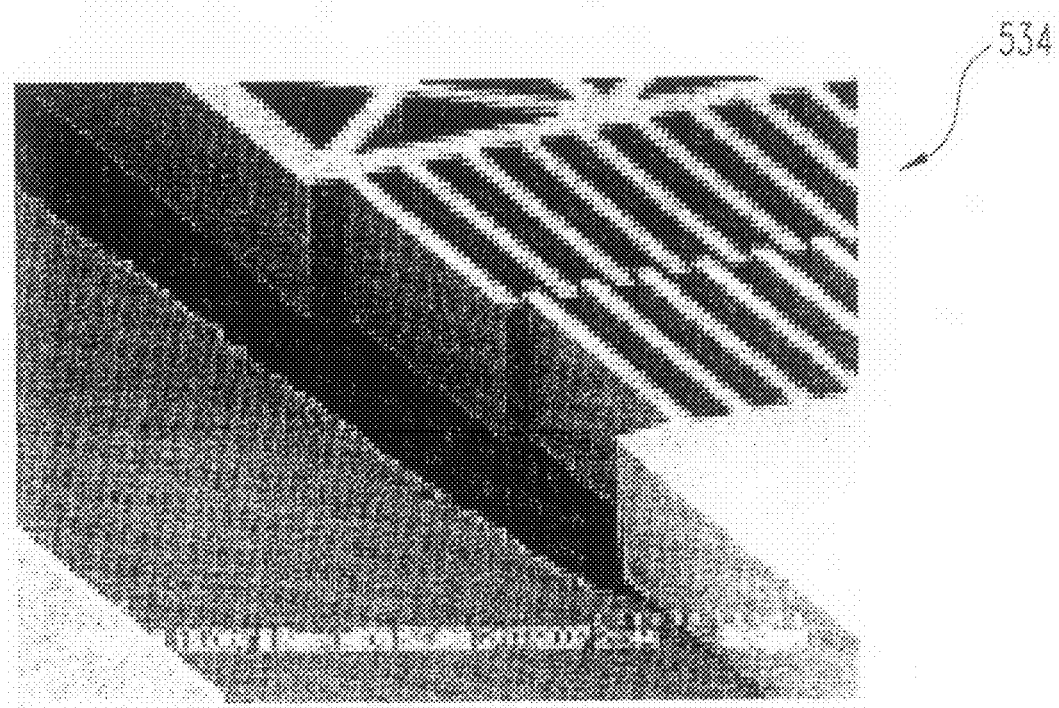
FIG. 11 is a computer-generated image of an electrostatic comb drive of the XY stage as circled on the right-hand side of FIG. 9 and enlarged relative thereto.

The simultaneous actuation and sensing strategy for electrostatic drives was tested with a MEMS parallel kinematic XY micropositioning stage 530 as depicted in the SEM images of FIGS. 9-11. FIG. 9 is a computer generated image of stage 530. FIG. 10 is a computer-generated image showing a portion of stage 530 enlarged to better depict a four bar linkage 532 with flexure hinges. FIG. 11 is a computer-generated image showing a portion of stage 530 enlarged to better depict electrostatic comb drive 534 used for testing. For stage 530, there are two independent kinematics chains that connect the end effector to the base (stator). Each of these kinematic chains includes two serially connected joints, a controlled prismatic joint implemented by linear comb dive 534, and a parallelogram 4-bar linkage 532, which maintains the orientation of the end effector invariant. Due to the parallel kinematic design, the stage has a high natural frequency (more than 1 KHz) and a motion range of about 14 μm at a driving voltage of 100 V.

A probe was integrated into stage 530 as a functional manipulator. Targeted applications, such as materials (thin film) characterization and mechanical testing of biological structures are among those that may benefit from the precise position sensing offered by this device. The fabrication of this device includes three patterning steps and two etching steps. The comb structures are fabricated by the DRIE Bosch process. The handle layer at the back of the device is also etched away so that the test sample can be fed from either the top or the bottom.

The fabricated comb drive 534 has 220 interdigitated finger pairs, thus about 440 gaps. The thickness of the fingers is about 50 μm and the gap between fingers is about 5 μm. The initial engagement of the interdigitated fingers is about 9 μm. With the above parameters, the initial capacitance from comb drive 534 is about 0.35 pF. If the maximum displacement of comb drive 534 is 15 μm, then the capacitance change will be only about 0.58 pF.

Compared with the parasitic capacitance from the measurement loop including coaxial cables and lock-in amplifier, which is generally several hundreds pF, the capacitance change of comb drive 534 is much smaller. This large parasitic capacitance in parallel with the resistor from the measurement loop decreases sensitivity to small capacitance changes that would typically be favored for phase change detection. Accordingly, for this experimental set-up, amplitude change was used as an indicator of capacitance change. A probe station was used to connect the signal to the electrodes of the comb drive 534. In order to increase the sensitivity, the parasitic capacitance in parallel with comb drive 534 was reduced by using single-wire cables instead of coaxial or tri-axial cables. The cables were routed far away from each other and their lengths were kept small. As a result, the parasitic capacitance parallel with the comb drive 534 was less than 10 pF.

The sensing signal was obtained as a reference signal from a commercial lock-in amplifier (SR850 from Stanford Research Systems, Inc) with a frequency of 100 KHz, which is about 100 times larger than the mechanical resonant frequency of the stage 530. The sensing signal has a magnitude of 1 V which induces a mechanical vibration amplitude is only 1/10,000 of 1 V dc input. Because drive 534 moves approximately 14 μm at 100 V, the 1 V, 100 kHz sensing signal only moved the mechanism by a negligible amount of $1.4 \times 10^{-7}$ μm. The actuation voltage was supplied by a voltage amplifier (Trek 623 B) and commanded by a function generator (HP/Agilent 33220A). All the circuitry was implemented on a breadboard and connected with the lock-in amplifier, power supply and probe station.

Figure 12:
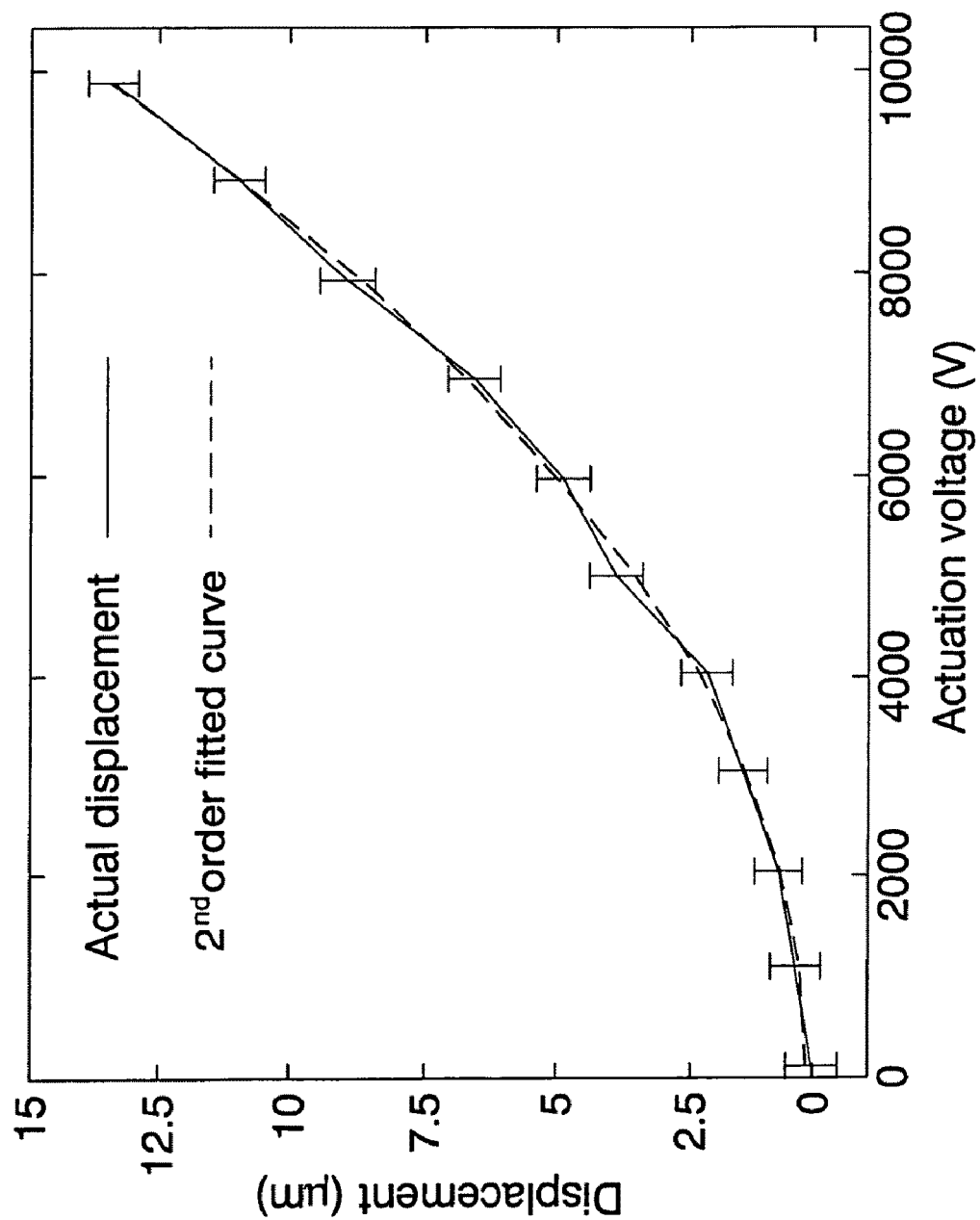
FIGS. 12 and 13 are graphs of observed electrostatic actuator displacement as a function of an actuation voltage drive signal and the square of the actuation voltage drive signal, respectively.
Figure 13:
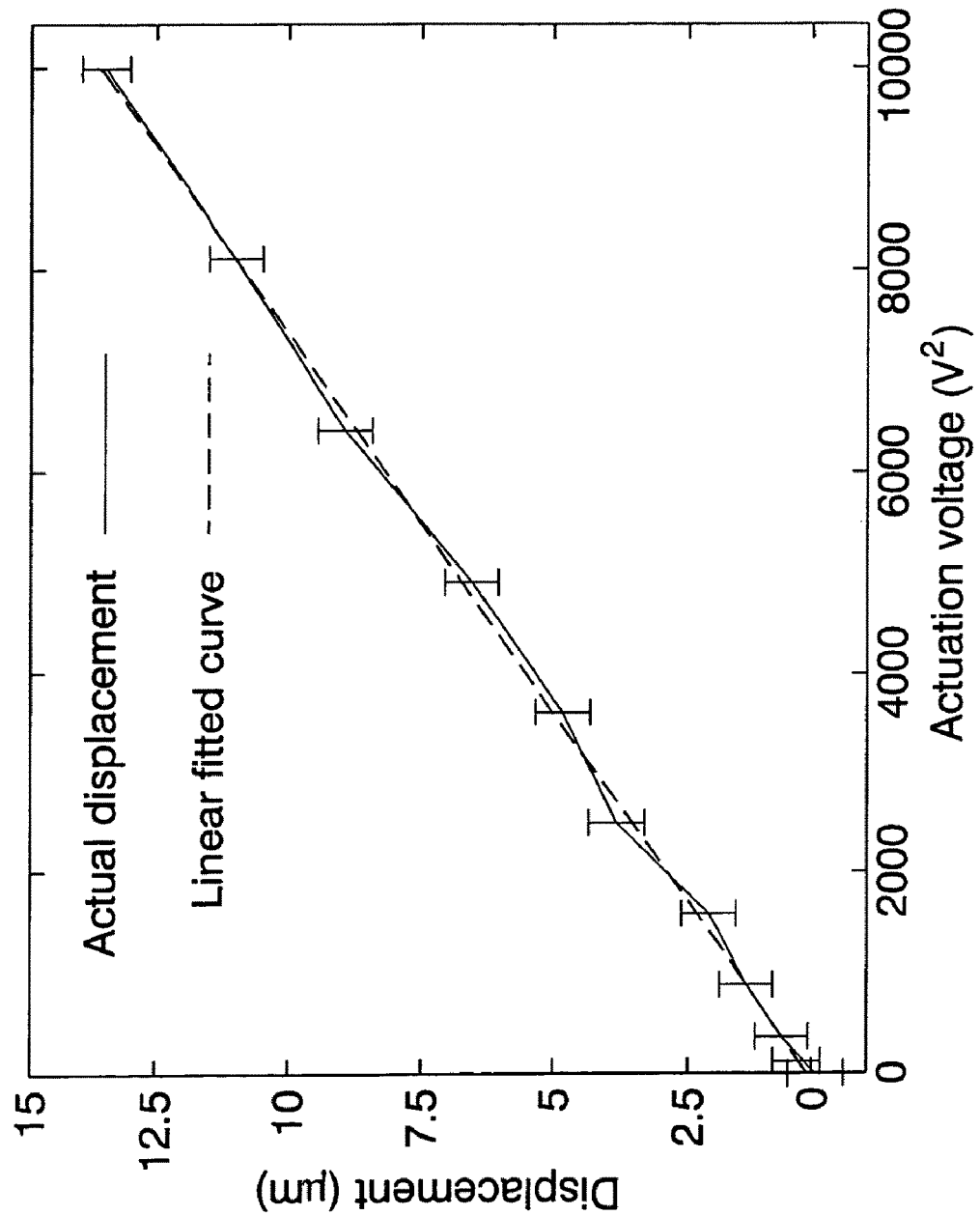

The driving voltage for an actuator was gradually incremented and the corresponding displacements of comb drive 534 were observed visually by tracking the motion of a feature on the end-effector with a microscope scale that has a resolution of 1 μm. At the same time, the amplitude of the voltage across the resistor of the RC circuit is measured by the lock-in amplifier at the sensing frequency. The graphs of FIGS. 12 and 13 depict electrostatic actuator displacement, as observed through the microscope, versus the actuation voltage drive signal and the square of the actuation voltage drive signal, respectively. The experimental data overlay the second order fitted parabola curves for displacement. Within the resolution of the microscope, the displacement follows a parabolic relationship with the driving voltage (FIG. 12) and a linear relationship with the square of the driving voltage (FIG. 13). Due to the limitation of the optical microscope, the resolution of the displacement is low, as shown by the error bars in FIG. 12.

Figure 14:
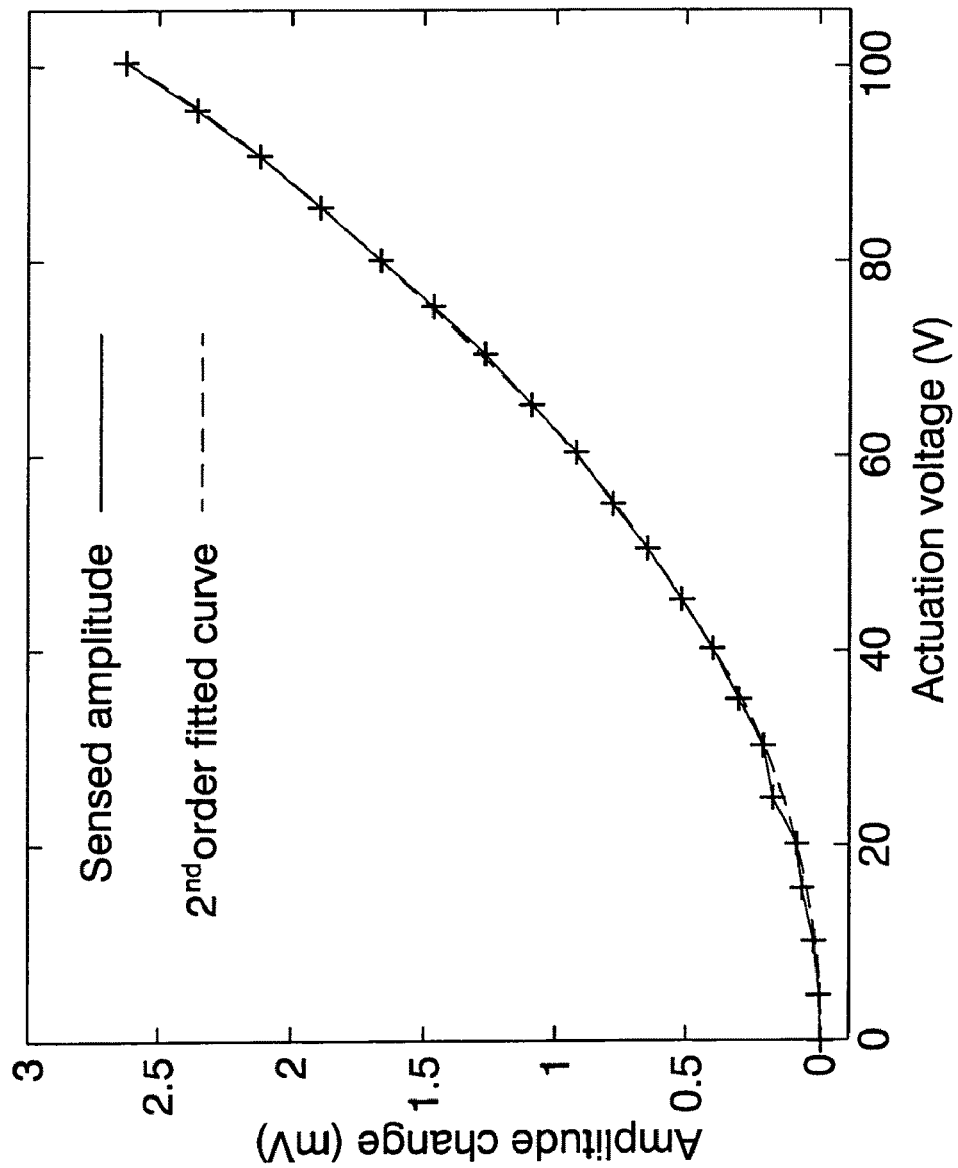
FIGS. 14 and 15 are graphs of a displacement evaluation signal observed with actuation monitoring circuitry as a function of the actuation voltage drive signal and the square of the actuation voltage drive signal, respectively.
Figure 15:
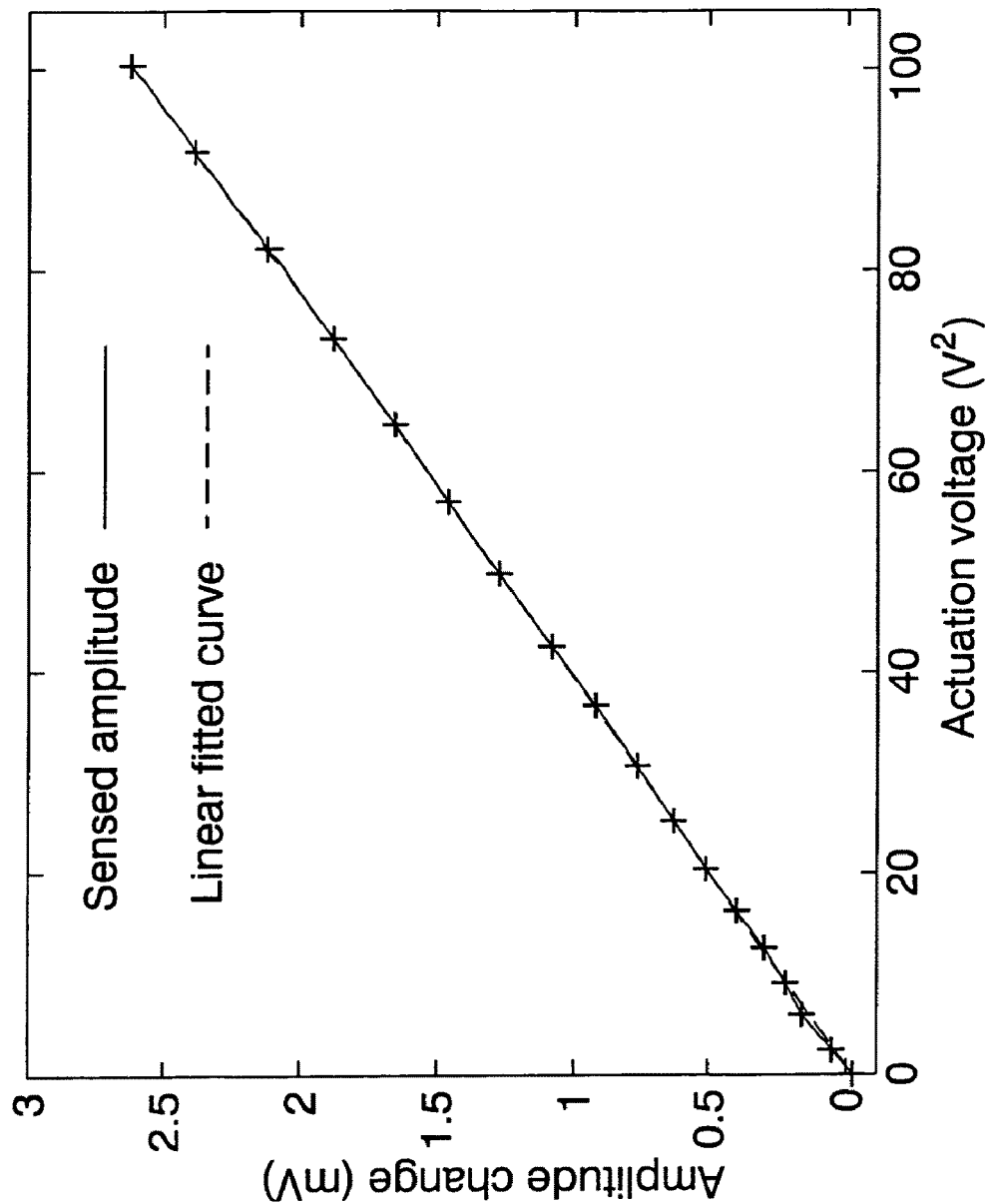

Next, the same experiment of increasing the actuation voltage in steps is carried out with the amplitude of the output from the lock-in amplifier recorded. The observed amplitude change from the lock-in amplifier is depicted by the graphs of FIGS. 14 and 15 versus actuation voltage drive signal and the square of the actuation voltage drive signal, respectively. The actual reading fits a second-order parabolic relationship with the driving voltage V with a high degree of conformity (FIG. 14), or a linear relationship to $V^2$ (FIG. 15). By offsetting the output and adjusting the sensitivity of the lock-in amplifier, a maximum amplitude change of about 2.6 mV with a resolution of 0.1 μV was achieved. Because a 2.6 mV amplitude change corresponds to about 14 μm displacement, a theoretical sub-nanometer (0.54 nm) displacement sensing resolution is justified based on these experimental results. Further, the measurement gain was 0.1857 mV μm-1.

Figure 16:
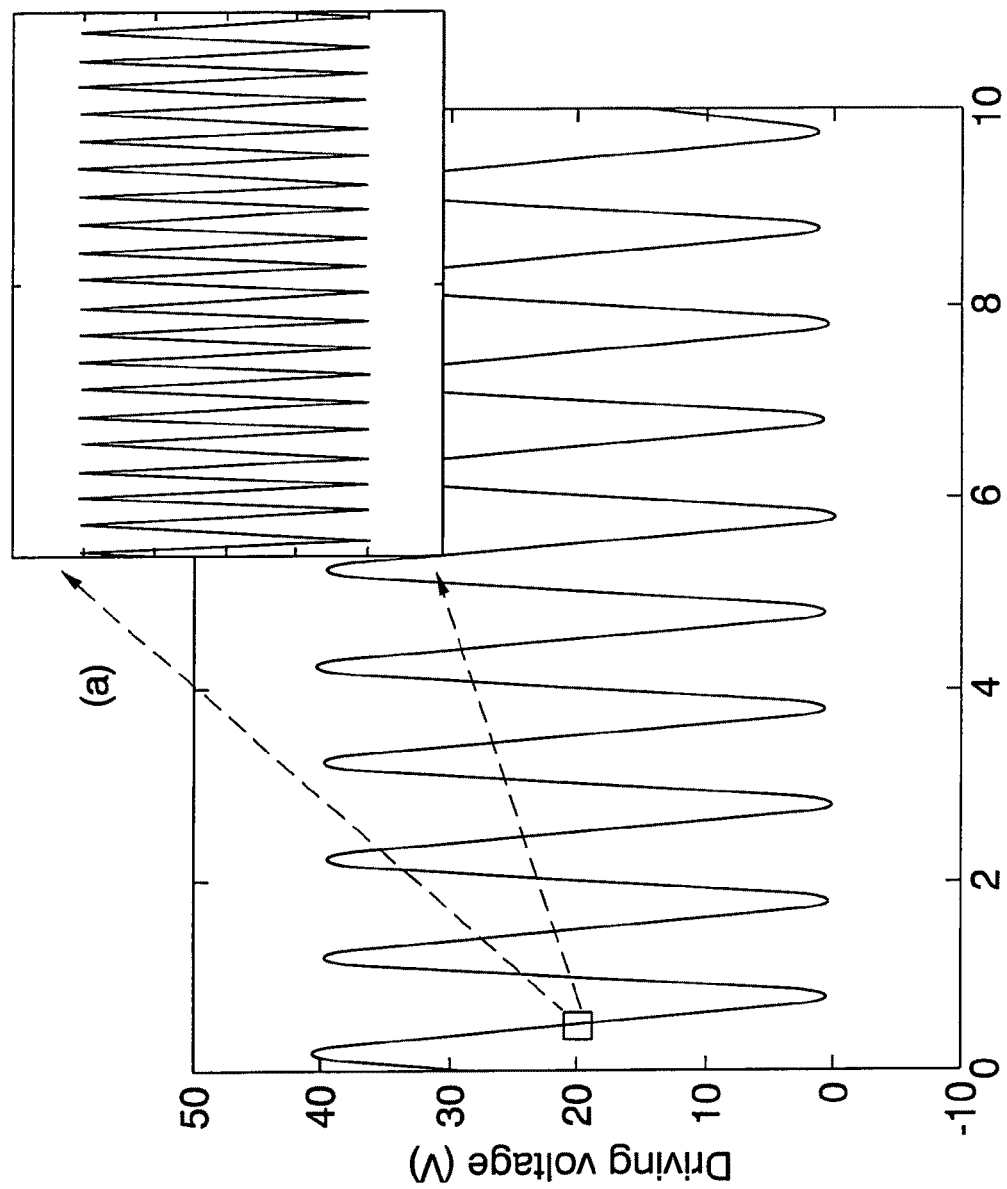
FIG. 16 is a graph of an electric drive signal with a 1 Hertz (Hz) actuation signal component superposed with a sensing signal component of 100 Kilohertz (KHz) (shown most clearly by the enlarged inset) for an electrostatic comb drive with a maximum natural resonant frequency of about 1 KHz.
Figure 17:
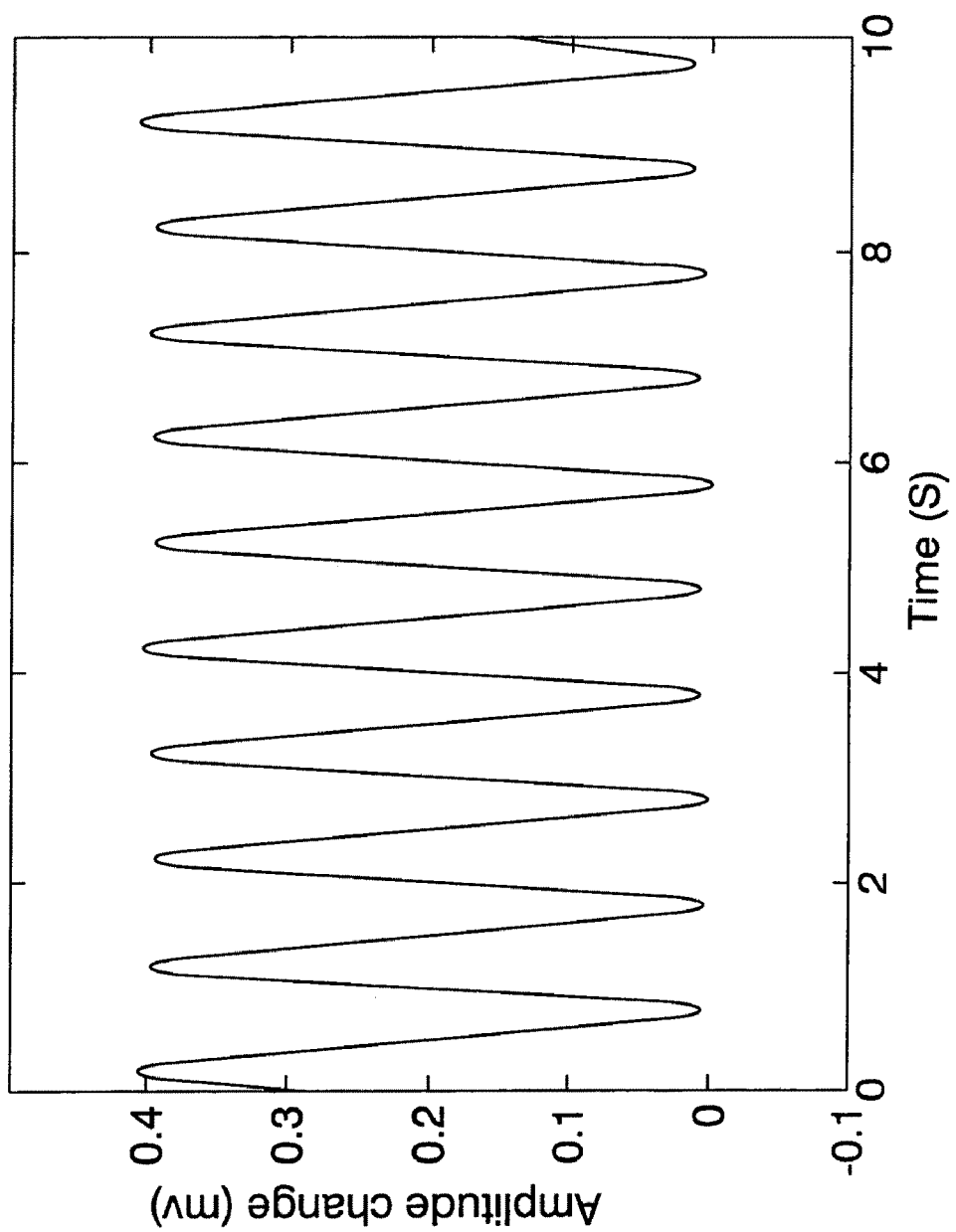
FIG. 17 is a graph of amplitude change observed by monitoring circuitry for the electric drive signal of FIG. 11.

FIG. 16 is a graph of an electric drive signal with a 1 Hertz (Hz) actuation signal component superposed with a sensing signal component of 100 Kilohertz (KHz) (shown most clearly by the enlarged inset) for the electrostatic comb drive 534 with a natural resonant frequency of about 1 KHz. FIG. 17 is a graph of amplitude change observed for the electric drive signal of FIG. 16. FIG. 16 demonstrates the ability of the approach in tracking a sinusoidal actuation input. The amplitude of the tracking signal matches well with that predicted from the static step measurements. Furthermore, the sensing signal reflects the actuating effect correctly. Because the sensing frequency is much higher than the actuation frequency, the time constant of the sensing response is much shorter than the time constant of the actuator response, thus the sensing method will give correct position measurement even when the drive capacitance keeps changing during the transition.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. Furthermore, all patents, patent applications, and publications cited herein are hereby incorporated by reference. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the inventions as defined herein are desired to be protected.

What is claimed is:

1. A method, comprising:
providing an electrostatic comb drive including a first electrode with several first fingers and a second electrode with several second fingers, the first fingers and the second fingers being interdigitated and spaced apart from one another;
applying an electric drive signal to the electrostatic comb drive, the electric drive signal including an actuation signal constituent and a sensing signal constituent, the sensing signal constituent being in a frequency range above a mechanical resonant frequency of the electrostatic comb device;
in response to the actuation signal constituent, changing displacement of the first electrode relative to the second electrode; and
evaluating the displacement by detecting a change corresponding to a capacitance variation between the first electrode and the second electrode as a function of the sensing signal constituent.

2. The method of claim 1, wherein the evaluating of the displacement includes determining at least one of a phase change and a magnitude change relative to the sensing signal constituent.

3. The method of claim 1, wherein the sensing signal constituent is at a frequency at least 100 times greater than the resonant frequency.

4. The method of claim 1, wherein the sensing signal constituent is at a frequency at least 1000 times greater than the resonant frequency.

5. The method of claim 1, wherein the electrostatic comb drive is of a linear type.

6. The method of claim 1, wherein the electrostatic comb drive is of a rotary type.

7. The method of claim 1, wherein a maximum amount of the displacement is less than 100 micrometers and which includes forming the drive and the circuitry using photolithographic techniques.

8. The method of claim 1, which includes:
generating a feedback signal as a function of the displacement; and
controlling operation of the electrostatic comb drive with the feedback signal.

9. An apparatus, comprising: a microelectromechanical device including:
an electrostatic comb drive including a first electrode with several first fingers and a second electrode with several second fingers, the first fingers and the second fingers being interdigitated and spaced apart from one another;
circuitry including:
a signal source to generate a electric drive signal with an actuation signal constituent and a sensing signal constituent, the sensing signal constituent being in a frequency range higher than a mechanical resonant frequency of the comb drive;
an electrical node to monitor an electrical evaluation signal indicative of displacement of the first electrode relative to the second electrode in response to the drive signal from the signal source;
a filter applied to the electrical response to output a response signal selective to the frequency range; and
a signal processing circuit to provide an output representative of the displacement in accordance with the response signal.

10. The apparatus of claim 9, wherein the signal processing circuit includes at least one of a comparator, a rectifier, and a mixer.

11. The apparatus of claim 9, wherein the signal processing circuit includes means for generating a feedback signal based on the output and the circuitry includes means for controlling the electrostatic comb drive as a function of the feedback signal.

12. The apparatus of claim 9, wherein the signal processing circuit includes a demodulator.

13. The apparatus of claim 9, wherein the signal source includes means for generating the sensing signal constituent at a frequency at least 1000 times greater than the mechanical resonant frequency.

14. An apparatus, comprising: a microelectromechanical device including:
a signal source to provide an electric drive signal including a displacement actuation signal constituent and a displacement sensing signal constituent;
a linear electrostatic drive including a first electrode and a second electrode spaced apart from the first electrode, the first electrode and the second electrode being responsive to the drive signal to change relative displacement therebetween, the displacement sensing signal constituent being at a frequency range higher than a mechanical resonant frequency of the drive; and
circuitry coupled to the drive to monitor electrical response of the linear electrostatic drive to the drive signal, the circuitry being structured to evaluate the displacement by detecting a change corresponding to capacitance variation between the first electrode and the second electrode as a function of the sensing signal constituent and the electrical response.

15. The apparatus of claim 14, wherein the circuitry includes at least one of a comparator, a rectifier, and a mixer.

16. The apparatus of claim 15, wherein the circuitry includes means for generating a feedback signal as a function of the displacement and means for controlling the linear electrostatic drive as a function of the feedback signal.

17. The apparatus of claim 14, wherein the first electrode includes several fingers and the second electrode includes several fingers interdigitated in a comb drive structure.

18. The apparatus of claim 14, wherein the circuitry includes a demodulator.

19. The apparatus of claim 14, wherein the signal source includes means for generating the displacement sensing signal constituent at a frequency at least 1000 times greater than the mechanical resonant frequency.

20. A method, comprising:
supplying a electric drive signal to a linear electrostatic actuator, the electric drive signal including an actuation signal constituent and a sensing signal constituent, the linear electrostatic actuator including a first electrode and a second electrode, the sensing signal constituent being at a frequency higher than a mechanical resonant frequency of the actuator;
in response to the actuation signal constituent, displacing the first electrode relative to the second electrode; and
detecting the displacing of the first electrode, which includes determining one or more of a change in magnitude and a change in phase of an evaluation signal relative to the sensing signal constituent.

21. The method of claim 20, wherein the first electrode includes several first fingers and the second electrode includes several second fingers interdigitated in a comb drive structure.

22. The method of claim 20, wherein the detecting includes demodulating an electrical response from the actuator.

23. The method of claim 20, wherein the sensing signal constituent is at a frequency at least 100 times greater than the resonant frequency and the actuation signal constituent has no frequency greater than the resonant frequency.

24. The method of claim 20, wherein the sensing signal constituent is at a frequency at least 1000 times greater than the resonant frequency.

25. The method of claim 20, which includes:
generating a feedback signal as a function of the displacing; and
controlling operation of the electrostatic actuator with the feedback signal.

26. A method, comprising: operating a microelectromechanical electrostatic actuator to selectively adjust mechanical state of a device operatively coupled to the actuator, the actuator including a first electrode and a second electrode, at least one of the first electrode and the second electrode being mechanically coupled to the device, the operating of the actuator including:
supplying an electric drive signal simultaneously including an electrostatic drive signal constituent and a sensing signal constituent, the sensing signal constituent being at a frequency higher than a mechanical resonant frequency of the actuator;
detecting displacement between the first electrode and the second electrode in response to the electrostatic drive signal constituent, which includes determining one or more of a change in magnitude and a change in phase of an evaluation signal relative to the sensing signal constituent as the electric drive signal is applied to cause the displacement; and
changing the mechanical state of the device in response to the displacement.

27. The method of claim 26, wherein the device includes a micropositioning stage.

28. The method of claim 27, wherein the micropositioning stage is of a two-dimensional parallel kinematic type including a number of bar linkages and flexure hinges.

29. The method of claim 26, wherein the first electrode includes several first fingers and the second electrode includes several second fingers interdigitated in a comb drive structure.

30. The method of claim 26, wherein the detecting includes demodulating an electrical response from the actuator.

31. The method of claim 26, wherein the sensing signal constituent is at a frequency at least 100 times greater than the resonant frequency and the actuation signal constituent has no frequency greater than the resonant frequency.

32. The method of claim 26, which includes:
generating a feedback signal as a function of the displacing;
regulating the displacement as a function of the feedback signal; and
controlling position of the device with the actuator.

* * * * *